United States Patent
Hsu

(10) Patent No.: US 9,430,838 B2
(45) Date of Patent: Aug. 30, 2016

(54) INTERACTIVE MOVABLE OBJECT TRACING SYSTEM AND INTERACTIVE MOVABLE OBJECT AND TRACING METHOD THEREOF

(71) Applicant: COMPAL COMMUNICATION, INC., Neihu, Taipei (TW)

(72) Inventor: Fu-Kuan Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 524 days.

(21) Appl. No.: 13/941,692

(22) Filed: Jul. 15, 2013

(65) Prior Publication Data

US 2014/0327529 A1 Nov. 6, 2014

(30) Foreign Application Priority Data

May 3, 2013 (TW) .............................. 102115819 A

(51) Int. Cl.
*G06T 7/00* (2006.01)
*G08C 17/02* (2006.01)

(52) U.S. Cl.
CPC .............. *G06T 7/0079* (2013.01); *G08C 17/02* (2013.01); *G06T 2207/20112* (2013.01); *G06T 2207/20144* (2013.01)

(58) Field of Classification Search
CPC .......... G06T 2207/20112; G06T 2207/20224; G06T 2207/20144; G06T 7/0079
See application file for complete search history.

(56) References Cited

U.S. PATENT DOCUMENTS

| | | | | |
|---|---|---|---|---|
| 2010/0060732 A1* | 3/2010 | Tsuji | .................... | G06K 9/2036 348/143 |
| 2010/0182340 A1* | 7/2010 | Bachelder | ............ | G02B 27/017 345/633 |
| 2011/0150285 A1* | 6/2011 | Kimura | ..................... | G01S 5/16 382/103 |
| 2012/0039529 A1* | 2/2012 | Rujan | .................. | G06K 7/1417 382/164 |
| 2013/0128054 A1* | 5/2013 | Densham | ............ | H04N 5/23296 348/169 |

\* cited by examiner

*Primary Examiner* — Michelle L Sams
(74) *Attorney, Agent, or Firm* — Kirton McConkie; Evan R. Witt

(57) ABSTRACT

An interactive object tracing system includes an interactive object including a control unit, a first communication module and a first display module and a portable communication device including a control module, a second communication module and an image capture module. The first display module, the second communication module and the image capture module are respectively used for displaying a specific color light, exchanging information, and capturing an image of the interactive object. A color information of the background of the interactive object is analyzed and a control signal is generated. The control signal is transmitted to the first communication module, so that the specific color light is displayed by the first display module according to the control signal so as to be easily identified. Therefore, the tracing accuracy is enhanced, the fabricating cost and the product size are reduced, and the intentions of using and purchasing of users are raised.

10 Claims, 5 Drawing Sheets

INTERACTIVE MOVABLE OBJECT TRACING SYSTEM AND INTERACTIVE MOVABLE OBJECT AND TRACING METHOD THEREOF

FIELD OF THE INVENTION

The present invention relates to a tracing system, and more particularly to an interactive object tracing system and an interactive object and a tracing method thereof.

BACKGROUND OF THE INVENTION

With growing of information technologies, the consumer electronics grows in incredible time. To match the requirements of users, a lot of types of the portable communication device are produced (e.g. a smart phone, a handheld game console, a tablet PC, a notebook PC, a personal digital assistant and a pocket PC). The portable communication device and the applications installed therein not only enhance the working efficiency, but also bring more joys in life.

In recent years, the augmented reality technology is popularly used in entertainment, education and business occasions. Take the traditional augmented reality technology for example, an image of an object in the real world is captured by an image capture device of a portable communication device, and then overlapped with a stage in the imaginary world.

Under this circumstance, the manner of tracing and identifying an object becomes an important topic. It exists some difficulty for detecting and identifying an object does not have position-sensing element and its movement and rotation. The conventional tracing manner utilizes an auxiliary marker attaching on the surface of the object and a sensor corresponding to the marker for tracing and identifying. However, deformations of the object are usually caused by attaching the auxiliary marker, and the tracing accuracy is decreased due to the deformations. In addition, when the object is moving or rotating, or when the position of the auxiliary marker is changed, an error of identifying or tracing may occur, so that the difficulty of identifying or tracing is increased. Also, attaching the auxiliary marker will raise the fabricating cost and product size of the object, effect the exterior of the object, and decrease the intentions of using and purchasing of users.

Although a manner of sight-identifying the movement and the position of the object is developed, the identifying accuracy is still limited by the factors of surface features of the object, type and shape of the object, computing ability of the tracing device, the background and the variation of the illuminance of the light source. In particular, errors and distortions may occur simultaneously.

There is a need of providing an interactive object tracing system and an interactive object and a tracing method thereof to obviate the drawbacks encountered from the prior art.

SUMMARY OF THE INVENTION

The present invention provides an interactive object tracing system and an interactive object and a tracing method thereof in order to eliminate the drawbacks caused by attaching markers on the object (e.g. low tracing and identifying accuracy, large product size, high fabricating cost, unsightly exterior, low attractiveness and errors and distortions).

The present invention also provides an interactive object tracing system and an interactive object and a tracing method thereof. The interactive object tracing system utilizes a first display module disposed on an interactive object for displaying a specific color light, which is easy to recognize and identify, so that the tracing and identifying accuracy is enhanced, the fabricating cost and the product size are reduced, the exterior is optimized and the intentions of using and purchasing of users are raised.

The present invention further provides an interactive object tracing system and an interactive object and a tracing method thereof. Via continuously sensing and analyzing the color information of the background of the interactive object and controlling the interactive object to display the specific color light that is easy to recognize and identify, the limitation factors of tracing and identifying are reduced, and errors and distortions occurred during sensing and tracing are avoided.

In accordance with an aspect of the present invention, there is provided an interactive object tracing system. The interactive object tracing system includes an interactive object and a portable communication device. The interactive object includes a control unit, a first communication module and a first display module, and the portable communication device includes a control module, a second communication module and an image capture module. The control unit is used for controlling the interactive object. The first communication module is connected with the control unit. The first display module is connected with the control unit for displaying a specific color light. The control module is used for controlling the portable communication device. The second communication module is connected with the control module for exchanging information with the first communication module. The image capture module is connected with the control module for capturing an image of the interactive object. A color information of the background of the interactive object is analyzed by the control module and a control signal is generated. The control signal is transmitted to the first communication module through the second communication module, so that the specific color light is displayed by the first display module according to the control signal so as to be easily identified.

In accordance with another aspect of the present invention, there is provided an interactive object traced by a portable communication device. The interactive object includes a main body, a control unit, a first communication module and a first display module. The control unit is received by the main body. The first communication module is received by the main body and connected with the control unit for receiving a control signal generated by the portable communication device according to a color information of the background of the main body. The first display module is disposed on the main body and connected with the control unit for displaying a specific color light according to the control signal, so that the specific color light is easily identified.

In accordance with still another aspect of the present invention, there is provided a tracing method. The tracing method includes steps of providing an interactive object and a portable communication device, capturing an image of the interactive object, analyzing a color information of the background of the interactive object, generating a control signal according to the color information, transmitting the control signal to the interactive object, and allowing the interactive object to display a specific color light according to the control signal, so that the specific color light is easily identified.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
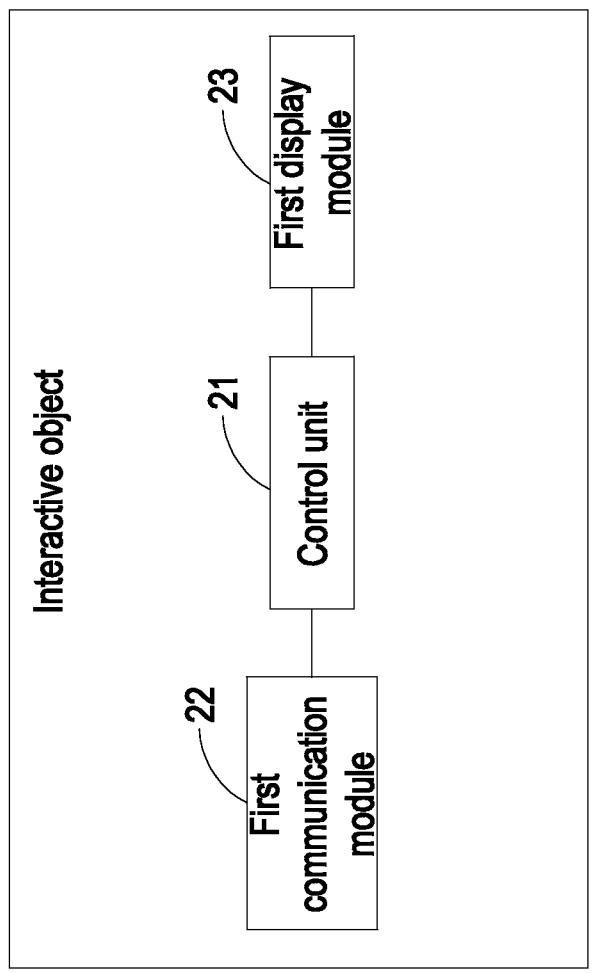
FIG. 1 schematically illustrates the configuration of an interactive object according to an embodiment of the present invention.
Figure 2:
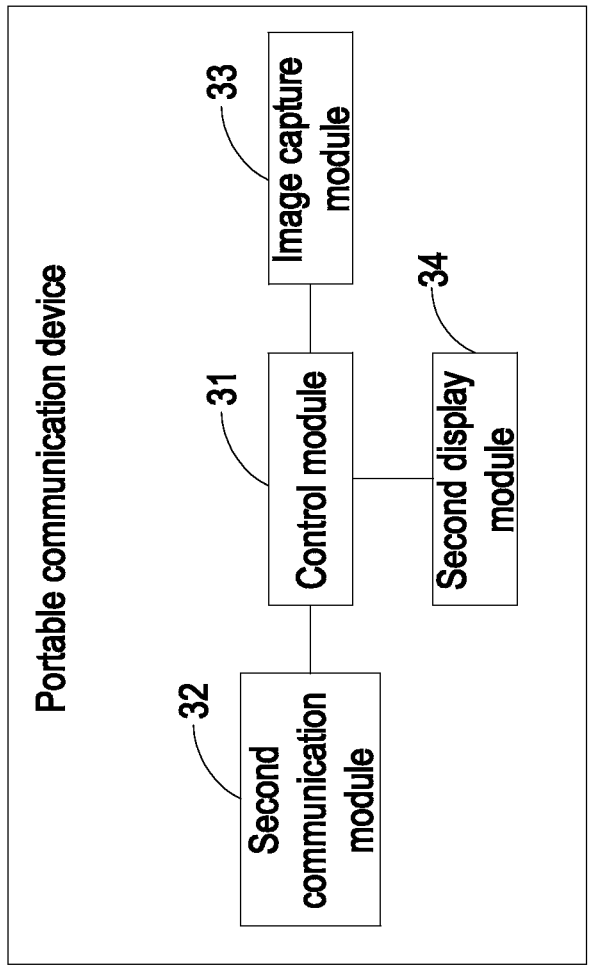
FIG. 2 schematically illustrates the configuration of a portable communication device according to an embodiment of the present invention.
Figure 3:
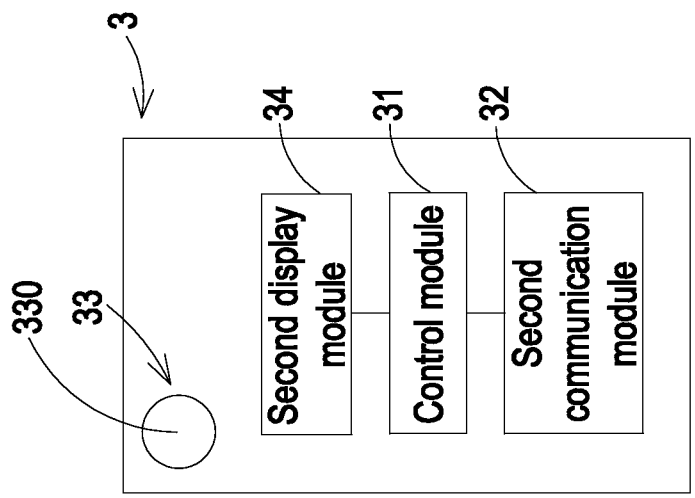
FIG. 3 schematically illustrates the configuration of an interactive object tracing system according to an embodiment of the present invention.
Figure 3:
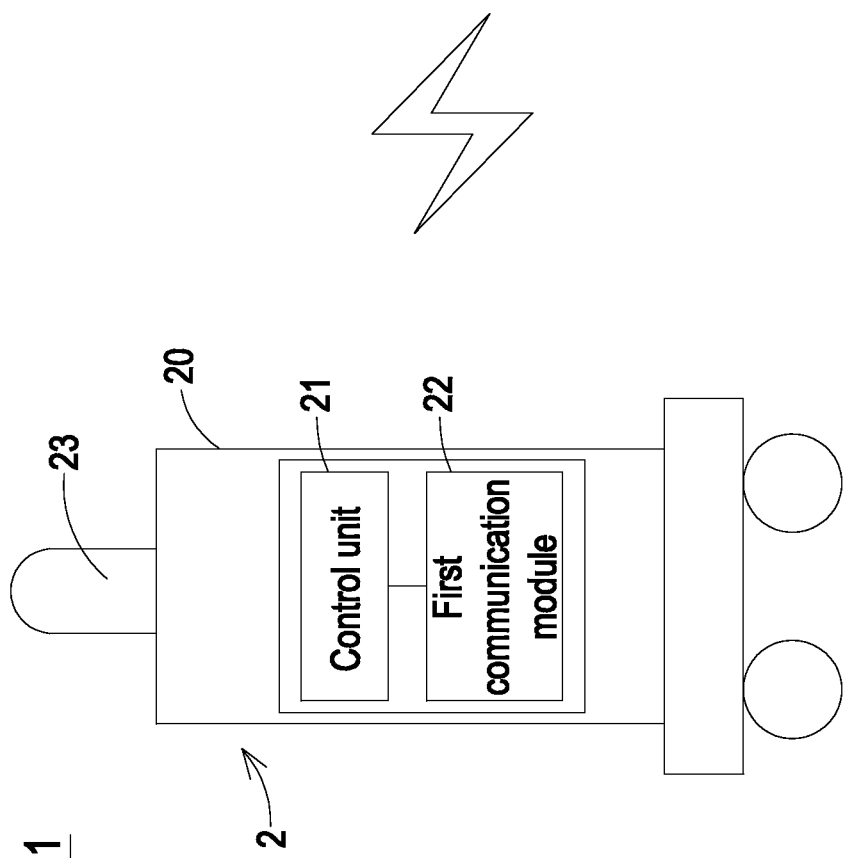

Please refer to FIG. 1, FIG. 2 and FIG. 3. FIG. 1 schematically illustrates the configuration of an interactive object according to an embodiment of the present invention. FIG. 2 schematically illustrates the configuration of a portable communication device according to an embodiment of the present invention. FIG. 3 schematically illustrates the configuration of an interactive object tracing system according to an embodiment of the present invention. The interactive object tracing system 1 of the present invention includes an interactive object 2 and a portable communication device 3, among which the interactive object 2 is an object in the real world, which is not limited to a robot, a remote control car, a remote control helicopter or a telephone, and the portable communication device 3 is not limited to a smart phone, a tablet PC, a Notebook PC, a laptop, a handheld game console, a PDA or a pocket PC. The interactive object 2 includes a control unit 21, a first communication module 22 and a first display module 23. The control unit 21 is used for controlling the interactive object 2, which means that the operations and the functions of the interactive object 2 are controlled by the control unit 21. The first communication module 22 is connected with the control unit 21. The first display module 23 is connected with the control unit 21 for displaying a specific color light. The specific color light is one of the three primary color lights (i.e. red light, greed light and blue light) or a color light combined with any ratio of the three primary color lights.

The portable communication device 3 includes a control module 31, a second communication module 32 and an image capture module 33. The control module 31 is used for controlling the portable communication device 3, which means that the operations and the functions of the portable communication device 3 are controlled by the control module 31. The second communication module 32 is connected with the control module 31 for exchanging information with the first communication module 22 of the interactive object 2. The image capture module 33 is connected with the control module 31 for capturing an image of the interactive object 2. A color information of the background of the interactive object 2 is analyzed by the control module 31 according to the image captured by the image capture module 33, and then a control signal is generated by the control module 31 according to the color information. The control signal is transmitted to the first communication module 22 of the interactive object 2 through the second communication module 32, so that the specific color light is displayed by the first display module 23 according to the control signal so as to be easily identified (relatively compared with the color of the background). In brief, the interactive object tracing system 1 utilizes a first display module 23 disposed on an interactive object 2 for displaying a specific color light, which is easy to recognize and identify, so that the tracing and identifying accuracy is enhanced, the fabricating cost and the product size are reduced, the exterior is optimized and the intentions of using and purchasing of users are raised.

In addition, the first communication module 22 of the interactive object 2 and the second communication module 32 of the portable communication device 3 include Bluetooth chips, wireless communication chips and/or RFID chips, but not limited thereto. Certainly, the first communication module 22 and the second communication module 32 are matched with each other, so that the information exchange between the first communication module 22 and the second communication module 32 can be implemented. For example, when the first communication module 22 includes a Bluetooth chip, the second communication module 32 also includes a Bluetooth chip for exchanging information with the first communication module 22 through Bluetooth communication technology.

In some embodiments, the image capture module 33 of the portable communication device 3 of the interactive object tracing system 1 includes an image sensor 330 for image capturing, continuously recording and the like. In another embodiment, the image capture module 33 includes a webcam or a digital video (DV) equipped with accessories like lens or filters in order to enhance the image quality during capturing.

Additionally, the first display module 23 of the interactive object 2 is controlled by the applications installed in the internal storage module (not shown) of the portable communication device 3, controlled by the control unit 21, or directly controlled by the control module 31 of the portable communication device 3 through the connections between the first communication module 22 and the second communication module 32, but not limited thereto. Certainly, the first display module 23 can also be controlled through other mobile communication technologies, remote controlling methods, identifying methods and tracing methods, as which the present invention teaches.

Please refer to FIG. 3 again. As shown in FIG. 3, the interactive object 2 of the interactive object tracing system 1 of the present invention includes a main body 20, and the control unit 21 and the first communication module 22 are received by the main body 20, which means that the control unit 21 and the first communication module 22 are disposed inside the main body 20 so as to be protected. Under this circumstance, the breakdowns of elements and modules are avoided. The first display module 23 is disposed on the main body 20. Preferably, the first display module 23 is at least partially exposed outside the main body 20, such that the specific color light can be effectively emitted and displayed without sheltering of the main body 20.

Figure 4:
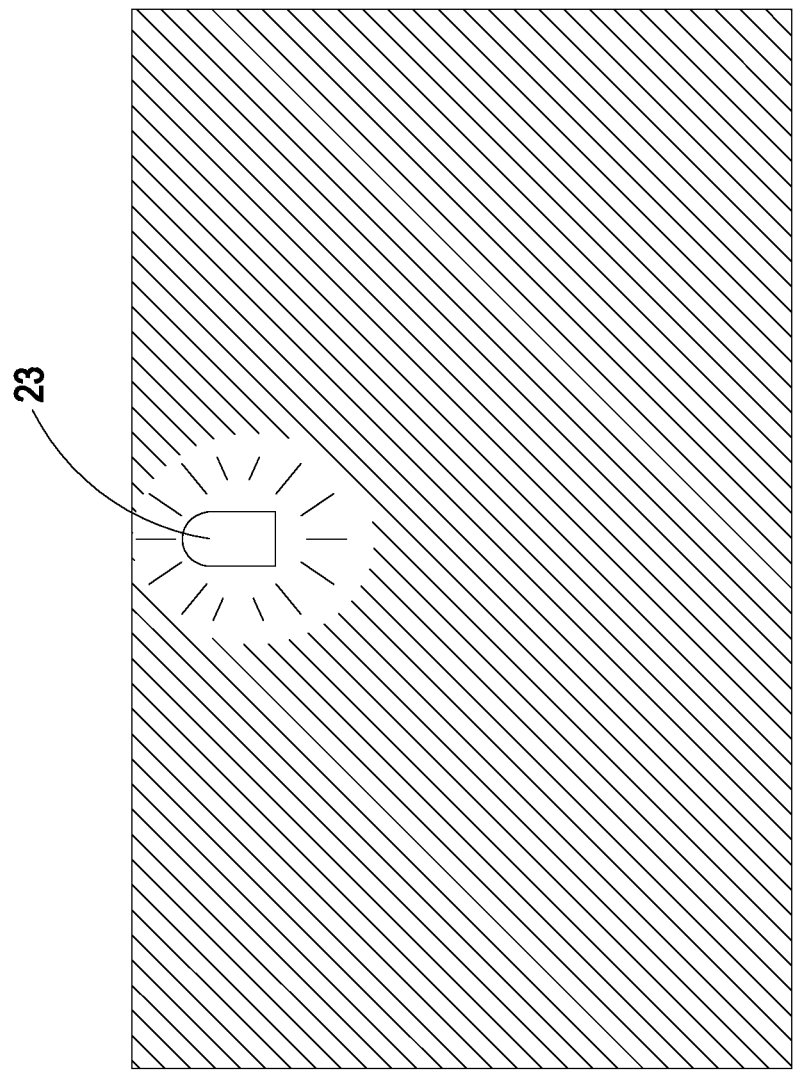
FIG. 4 schematically illustrates an image of an interactive object captured by an image capture module of a portable communication device according to an embodiment of the present invention.

Please refer to FIG. 3 and FIG. 4. FIG. 4 schematically illustrates an image of an interactive object captured by an image capture module of a portable communication device according to an embodiment of the present invention. When the image capture module 33 of the portable communication device 3 of the interactive object tracing system 1 is capturing the image of the interactive object 2 and none of color lights, which are easily identified, is emitted or displayed by the first display module 23, a color information of the background of the interactive object 2 is analyzed by the control module 31 of the portable communication device 3, among which the interactive object 2 is located at the environment and the background thereof. A control signal is generated by the control module 31 according to the color information and then transmitted to the first communication module 22 through the second communication module 32, so that the specific color light, which can be easily identified, recognized and traced, is displayed and emitted by the first display module 23. In other words, after the image of the interactive object 2 is captured by the image capture module 33 of the portable communication device 3, the color information of the background of the interactive object 2 is analyzed by the control module 31 according to the image. The specific color light, which can be easily identified in the background, is also determined by the control module 31, and the control signal corresponding to the chosen specific color light is generated. Finally, the control signal is transmitted to the first display module 23 and the specific color is displayed or emitted by the first display module 23 for the incoming actions and operations of identifying, recognizing and tracing.

In some embodiments, when the specific color light is displayed and emitted by the first display module 23 of the interactive object 2, the image capture module 33 of the portable communication device 3 continuously captures images of the interactive object 2. When the interactive object is moved to another environment and another background thereof. A color information of the background of the interactive object 2 is still analyzed by the control module 31 according to the image captured by the image capture module 33, and the first display module 23 of the interactive object 2 is still controlled by the control module 31 to display or emit another specific color light, which is also easily identified.

In accordance with an aspect of the present invention, the portable communication device 3 further includes a second display module 34, which is a display panel in this embodiment. When the specific color light, which is easily identified, is displayed by the first display module 23 and the image of the interactive object 2 is captured by the image capture module 33 of the portable communication device 3 (i.e. the specific color light is detected by the image capture module 33 and the control module 31), the second display module 34 is controlled by the control module 31 to display the image capture by the image capture module 33, as which can be utilized to applications of the augmented reality.

In some embodiments, after the specific color light, which is easily identified, is displayed by the first display module 23 of the interactive object 2, the portable communication device 3 of the interactive object tracing system 1 repeatedly captures the image of the interactive object 2 through the image capture module 33, analyzes the image and the color information of the background thereof through the control module 31, generates the control signal according to the color information through the control module 31, transmits the control signal to the first communication module 22 of the interactive object 2 through the second communication module 32, and controls the first display module 23 to display the specific color light through the control signal. Therefore, since the interactive object is continuously traced, recognized and identified by the portable communication device 3 of the interactive object tracing system 1 of the present invention, the limitation factors of tracing and identifying are reduced, and errors and distortions occurred during tracing are avoided.

Figure 5:
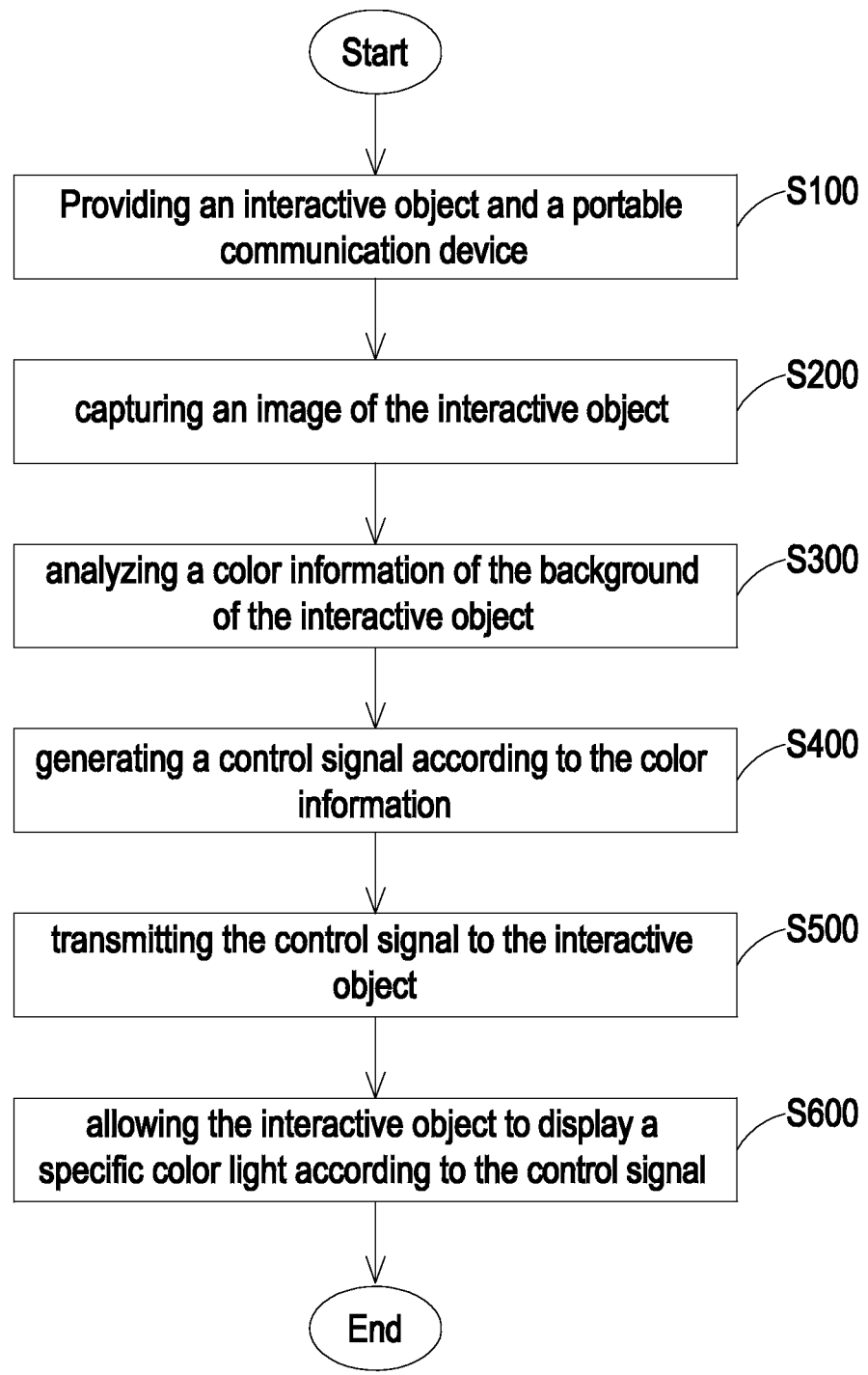
FIG. 5 schematically illustrates the flow chart of a tracing method according to an embodiment of the present invention.

Please refer to FIG. 3 and FIG. 5. FIG. 5 schematically illustrates the flow chart of a tracing method according to an embodiment of the present invention. The tracing method of the present invention includes steps as following: at first, providing an interactive object 2 and a portable communication device 3 as shown in step S100; next, capturing an image of the interactive object 2 as shown in step S200; then, analyzing a color information of the background of the interactive object 2 as shown in the step S300; next, generating a control signal according to the color information as shown in step S400; then, transmitting the control signal to the interactive object 2 as shown in step S500; and allowing the interactive object 2 to display a specific color light according to the control signal as shown in step S600, so that the specific color light is easily identified. In this embodiment, the characteristics, the configurations and the structures of the interactive object 2 and the portable communication device 3 are similar to those of the interactive object tracing system of the embodiment mentioned above, and are not redundantly described herein.

From the above description, the present invention provides an interactive object tracing system and an interactive object and a tracing method thereof. The interactive object tracing system utilizes a first display module disposed on an interactive object for displaying a specific color light, which is easy to recognize and identify, so that the tracing and identifying accuracy is enhanced, the fabricating cost and the product size are reduced, the exterior is optimized and the intentions of using and purchasing of users are raised. On the other hand, via continuously sensing and analyzing the color information of the background of the interactive object and controlling the interactive object to display the specific color light that is easy to recognize and identify, the limitation factors of tracing and identifying are reduced, and errors and distortions occurred during sensing and tracing are avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interactive movable object tracing system comprising:
   an interactive movable object, comprising:
      a first processor for controlling said interactive movable object;
      a first communication chip connected with said first processor; and
      a first display connected with said first processor for displaying a specific color light; and
   a portable communication device, comprising:

a second processor for controlling said portable communication device;

a second communication chip connected with said second processor for exchanging information with said first communication chip; and a camera connected with said second processor for capturing an image of said interactive movable object, wherein a color information of the background of said interactive movable object is analyzed by said second processor and a control signal is generated, and said control signal is transmitted to said first communication chip through said second communication chip, so that said specific color light is displayed by said first display according to said control signal so as to be easily identified.

2. The interactive movable object tracing system according to claim 1 wherein said first communication chip and said second communication chip are matched with each other.

3. The interactive movable object tracing system according to claim 1 wherein said interactive movable object includes a main body, and said first processor and said first communication chip are received by said main body, and wherein said first display is disposed on said main body.

4. The interactive movable object tracing system according to claim 3 wherein said first display of said interactive movable object is at least partially exposed outside said main body.

5. The interactive movable object tracing system according to claim 1 wherein said specific color light is one of the three primary color lights or a color light combined with any ratio of the three primary color lights.

6. The interactive movable object tracing system according to claim 1 wherein said camera of said portable communication device includes an image sensor.

7. The interactive movable object tracing system according to claim 1 wherein said first display module of said interactive movable object is controlled by said first processor.

8. The interactive movable object tracing system according to claim 1 wherein said first display of said interactive movable object is controlled by said second processor of said portable communication device through said first communication chip and said second communication chip.

9. An interactive movable object traced by a portable communication device, said interactive movable object comprising:

a main body;

a first processor received by said main body;

a first communication chip received by said main body and connected with said first processor for receiving a control signal generated by said portable communication device according to an analysis of a color information of the background of said main body; and a first display disposed on said main body and connected with said first processor for displaying a specific color light according to said control signal, so that said specific color light is easily identified.

10. A tracing method comprising steps of:

providing an interactive movable object and a portable communication device;

capturing an image of said interactive movable object;

analyzing a color information of the background of said interactive movable object;

generating a control signal according to said color information;

transmitting said control signal to said interactive movable object; and allowing said interactive movable object to display a specific color light according to said control signal, so that said specific color light is easily identified.

\* \* \* \* \*